Jan. 28, 1930.  E. FREUD  1,744,877
VALVE
Filed April 2, 1929
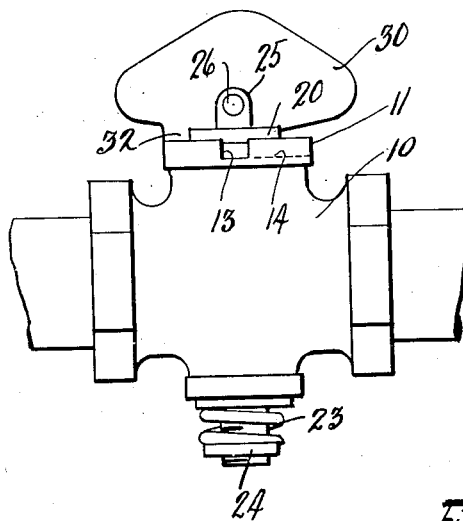
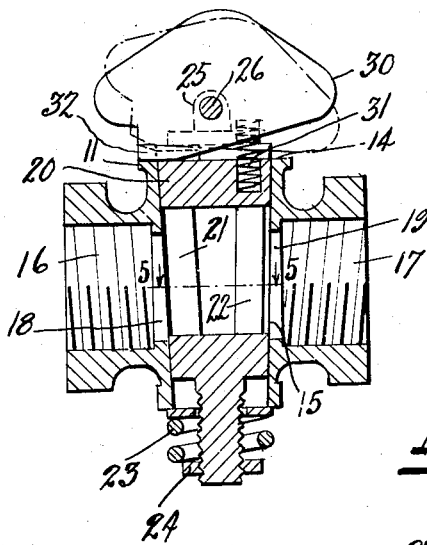
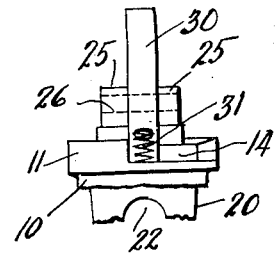
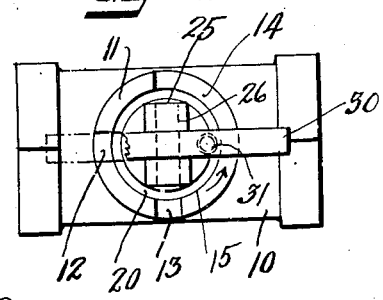
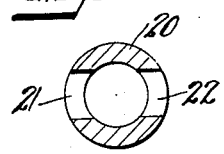
INVENTOR
Emil Freud
BY Maurice Bloch
ATTORNEY Patented Jan. 28, 1930

1,744,877

UNITED STATES PATENT OFFICE

EMIL FREUD, OF BROOKLYN, NEW YORK

VALVE

Application filed April 2, 1929. Serial No. 351,873.

This invention relates to improvements in fluid controlling cocks or valves and has for one of its objects the provision of a valve of the character referred to provided with means for positively locating and releasably locking the port containing stem in open and closed position.

Another object of the invention is to provide the valve casing in a valve of the character referred to with locating notches and a spring pressed handle pivotally mounted on the valve stem and adapted to engage the said notches to properly aline the ports in the said stem when the valve is in its respective open or closed position.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claim.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a view in side elevation of my improved valve.

Figure 2 is a vertical sectional view thereof.

Figure 3 is a fragmental end view of the device looking from the right of Fig. 1.

Figure 4 is a top plan view of the valve and

Figure 5 is a cross sectional view of the valve stem taken on line 5—5 Fig. 2.

Referring now to the drawings in detail 10 indicates a valve casing having at its upper end a flange 11 provided with notches 12 and 13 and a cutout or stepped down portion or zone 14. The said casing is also provided with a vertically disposed tapering bore 15 which opens into branches 16 and 17 by means of ports or openings 18 and 19 respectively. A valve stem 20 provided with ports or openings 21 and 22 is suitably mounted in the said bore 15 and frictionally maintained therein by means of a coiled spring 23 and a nut 24 threaded on the end of the valve stem 20. The top of the valve stem is provided with a pair of ears 25 through which passes a pin 26 upon which there is pivotally mounted a handle or finger piece 30 whose thickness is equal to the width of the slots 12 and 13 and which slots the said finger piece is adapted to engage when the valve is in its open or closed position respectively. A coiled spring 31 exerting a tension between the said finger piece 30 and valve stem 20 forces the end 32 of the finger piece into the said slots when in proper alinement.

The valve as illustrated in the drawings is shown in open position, that is, with the ports 21 and 22 in the valve stem in alinement with the ports or openings 18 and 19 in the valve casing. To close the valve, the right hand end of the finger piece or handle 30 is depressed against the tension of the spring 31, which action will cause the end 32 to be lifted out of the slot 12 and clear the top of the flange 11 as shown in dot and dash lines Fig. 2. When the handle is in this position the stem 20 is revolved through an angle of 45° in the direction of the arrow Fig. 4 until the end 32 is directly in line with the notch 13 at which time the handle is released and the spring 31 will force the said end into the notch 13. In this position the ports 21 and 22 will be out of registry with the ports 18 and 19 and the valve will be closed. The cutout or recessed zone 14 permits of the said rotation of the handle 30.

From the foregoing it will be seen that I have provided a simple and efficient valve adapted for use with water, steam, gas, etc. and provided with means for positively opening and closing the said valve and maintaining same in the said respective positions against accidental displacement.

Having described my invention what I claim as new and desire to secure by Letters Patent is:

In a valve of the nature described, a casing having ports therein, a valve stem also provided with ports rotatably mounted in the casing, a flange on the casing provided with a pair of notches, a handle pivotally mounted on the valve stem, a projection integral with the handle adapted to engage one of the said notches when the ports in the stem are in complete alinement with the ports in the casing and likewise adapted to engage the other of the said notches when the stem is rotated to bring the said ports completely out of alinement with each other, a stop for the handle on the flange opposite each of the notches, and a spring operating between the handle and stem to releasably maintain the handle in the aforementioned notches.

In testimony whereof I hereunto affix my signature.

EMIL FREUD.